United States Patent Office 3,427,341
Patented Feb. 11, 1969

3,427,341
PREPARATION OF PEROXY-ESTERS BY REACTION OF A PERACETAL AND A BASE
Philip S. Bailey and Yun Ger Chang, Austin, Tex., assignors to Reichhold Chemicals Inc., White Plains, N.Y.
No Drawing. Filed Oct. 11, 1966, Ser. No. 585,774
U.S. Cl. 260—453        10 Claims
Int. Cl. C08f 1/60; C07c 67/00

ABSTRACT OF THE DISCLOSURE

A method of producing peroxy esters which comprises reacting a base with a peracetal having the following formula

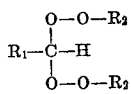

wherein $R_1$ is an alkyl or aryl group, and $R_2$ represents an alkyl group, the quantity of the base used being less than the equivalent amount based on the peracetal.

---

This invention relates to a new method of producing peroxy esters and to the resulting product.

An object of this invention is to provide a highly efficient method for manufacturing peroxy esters.

Another object of this invention is to provide a method for producing peroxy esters that yield a high purity product.

Still another object is to provide a process whose reactions are relatively controllable to give the desired product.

These and other objects will be apparent from the following description:

Peroxy esters have previously been prepared by the reaction of acyl halides with alkyl hydroperoxides in the presence of a base. For example, t-butyl perbenzoate has been prepared by the reaction of benzoyl chloride with t-butyl hydroperoxide in the presence of sodium hydroxide. Likewise, t-butyl peroxyisobutyrate has been obtained by the reaction of isobutyryl chloride with t-butyl hydroperoxide in the presence of caustic. The acid chlorides are often difficult to obtain and expensive to manufacture.

In contrast to the above process, the starting materials for this invention are readily available aldehydes. For example, isobutyraldehyde is readily available from the oxo reaction of carbon monoxide and hydrogen with propylene and is, thus, an inexpensive and readily available intermediate. The aldehydes are reacted first with an alkyl hydroperoxide in the presence of a mineral acid, to produce the corresponding peracetals readily and in high yields. It has now been discovered that peresters are formed when peracetals are reacted with a base.

To illustrate more specifically, i.e. exemplify this broad invention, when di(t-butylperoxy)phenylmethane, which is derived from benzaldehyde and t-butyl hydroperoxide, is treated with pyridine, the perester t-butyl perbenzoate is formed. Similarly, 1,1-di(t-butylperoxy)-2-methylpropane which is derived from isobutyraldehyde and t-butyl hydroperoxide, is converted in the presence of piperidine into t-butyl peroxyisobutyrate.

In order to more clearly understand the mechanisms which are believed to be involved in the process of this invention, the following equations are given, wherein B is the base:

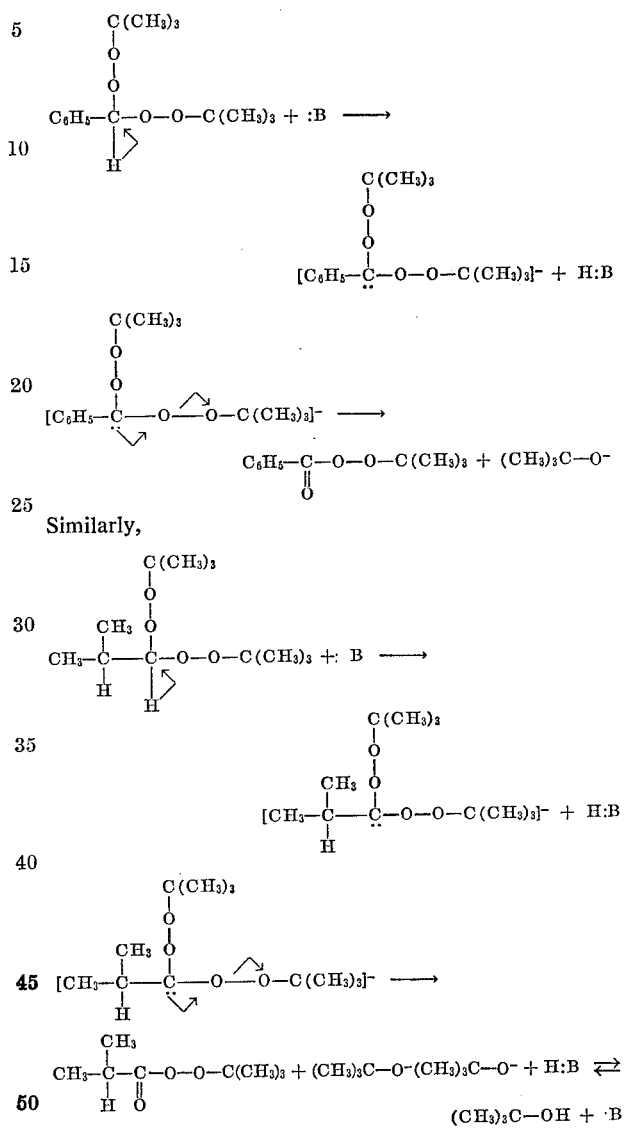

The following are illustrative examples.

Example I

To 23.73 g. (0.30 mole) of pyridine was slowly added 16.06 g. (0.06 mole) of di(t-butylperoxy)phenylmethane, with stirring. The resulting homogeneous solution was stirred at 40–50° C. for three hours longer, and then allowed to stand at room temperature overnight. The reaction mixture was diluted with 50 ml. of water, and then extracted three times with 30-ml. portions of ether. The ether extract was successively washed three times each with 50-ml. portions of water, 8-ml. portions of 10% sulfuric acid, 10-ml. portion of water, 8-ml. portions of 5% sodium hydroxide solution, and 10-ml. portions of water, after which it was dried over anhydrous magnesium sulfate. Filtration and removal of ether under reduced pressure left a light-brown liquid weighing 10.10 g. (86.8% based on the peracetal used). The product was distilled at 64–66° C./0.7 mm. The distillation indicated that the purity of the crude product was 92.3%. The distilled product had $n_D^{25}$ 1.4936 and $d_4^{25}$ 1.0200. The infrared spectrum of this compound was identical with that of an authentic t-butyl perbenzoate sample.

EXAMPLE II

To 8.52 g. (0.10 mole) of piperidine was slowly added 4.68 g. (0.02 mole) of freshly distilled 1,1-di(t-butyl-peroxy)-2-methylpropane at room temperature in the course of 10 minutes. The addition caused a spontaneous increase in temperature. The reaction mixture was stirred at 50° C. for 2 hours, and then diluted with 20 ml. of water. Following the procedure described in Example I, a light-brown liquid product was obtained; it weighed 1.61 g. (50.3% yield based on the peracetal used). The crude product has an active oxygen content of 9.57%, determined by reaction with HI solution, and 3.55%, determined by reaction with KI solution. After being purified by distillation at 30–31° C./10 mm., the colorless liquid product contained 9.83% and 8.02% active oxygen determined by the reaction with HI and KI, respectively. The infrared spectrum of this compound was almost identical with that of the authentic t-butyl peroxy-isobutyrate, showing a strong band at 1720–1730 cm.$^{-1}$ due to the >C=O group and a strong band at 845 cm.$^{-1}$ due to the peroxy group.

EXAMPLE III

To a solution of 2.68 g. (0.01 mole) of di(t-butyl-peroxy)phenylmethane in 15 ml. of benzene was slowly added 1.12 g. (0.01 mole) of a 50% potassium hydroxide solution at room temperature with agitation. The reaction mixture was stirred at 50° C. for three hours and then allowed to stand at room temperature for about 60 hours. It was diluted with 15 ml. of water, and then extracted 3 times with 10-ml. portions of ether. The ether extract was washed 5 times with small portions of water and dried with anhydrous magnesium sulfate.

Filtration and removal of low-boiling materials under reduced pressure left a light-brown liquid weighing 1.90 g. The product was purified by distillation at 60–62° C./0.7 mm. The distilled colorless liquid had an active oxygen content of 8.10%, $n_D^{25}$ 1.4931, and $d_4^{25}$ 1.0180. The infrared spectrum of this compound was identical with that of an authentic t-butyl perbenzoate sample.

As can be seen, therefore, peracetals having the general formula

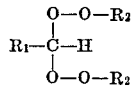

wherein $R_1$ is an alkyl or aryl group, and $R_2$ represents an alkyl group, preferably a tertiary alkyl group, may be converted by a base to the corresponding peresters having the formula

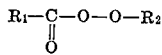

The above examples are intended to be illustrative only and not to limit the invention to the specific details set forth therein. Thus, the composition and proportions of the base might vary widely. Although theoretically only a catalytic amount of base is required, faster conversions are achieved when a substantial proportion of the base is employed, for example, at least 10% of the equivalent amount based on the peracetal. Indeed, a large excess of base often may be employed with excellent results.

The reaction conditions including time, temperature, and pressure may also be varied over wide limits. Temperatures ranging from 20° C. to 150° C. may be employed provided that the reaction time is also controlled. For example, it is possible to effect good conversion of a peracetal to a perester by heating the reaction for a very short time, i.e., five minutes at 150° C. The same degree of conversion may require many hours or days at lower temperatures, for example, five hours at 50° C. The best time and temperature relationship will depend upon the combination of peracetal and base employed but, in general, the optimum temperature appears to be in the range 25–50° C. with the reaction time in the range of one to ten hours. The reaction may be carried out at reduced pressure or at super-atmospheric pressure, but no particular advantage accrues; good results are achieved at atmospheric pressure.

While certain bases have been utilized, as has been stated in the examples presented hereinabove, it has been found that the bases which can be used include alkali metal compounds, such as sodium hydroxide, potassium hydroxide, sodium alkoxides, potassium alkoxides, and/or organic bases such as pyridine, piperidine, morpholine, mono-, di- and tri-alkyl and -aryl amines, and mixtures thereof.

The peroxides which may be produced by the present invention find wide utility as initiators for vinyl polymerization, for example, in the production of polystyrene, polyethylene, etc.

From the above it will be apparent that many variations may be made in the process of this invention without departing from the spirit and scope thereof, as defined in the appended claims.

We claim:
1. A method of producing peroxy esters having the following formula $R_1$—C—OO $R_2$ which comprises reacting at a temperature of from about 20° C. to 150° C. a base with a peracetal having the following formula

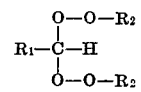

wherein $R_1$ is selected from a group consisting of phenyl and lower alkyl radicals, and $R_2$ is a t-lower alkyl radical, the quantity of the base used being less than the equivalent amount based on the peracetal.

2. A method according to claim 1 wherein the base is organic.

3. A method according to claim 1 wherein the base is inorganic.

4. A method according to claim 1 wherein the base is used in a proportion of about 10% of the equivalent amount based on the peracetal.

5. A method according to claim 1 wherein the base is pyridine.

6. A method according to claim 1 wherein the base is piperidine.

7. A method according to claim 1 wherein the base is potassium hydroxide.

8. A method according to claim 1 wherein the reaction temperature is about 150° C. and the time about 5 minutes.

9. A method according to claim 1 wherein the temperature is about 50° C. and the time about 5 hours.

10. A method according to claim 1 wherein the reaction temperature is maintained within the approximate range of 20–50° C. for a period ranging from about one hour at 50° C. to 10 hours at 25° C.

References Cited

Chemical Abstracts, vol. 62, p. 6652c.

CHARLES B. PARKER, *Primary Examiner.*

S. T. LAWRENCE, III, *Assistant Examiner.*

U.S. Cl. X.R.

260—610, 94.9, 93.5